United States Patent
Takeuchi et al.

(10) Patent No.: US 7,116,650 B2
(45) Date of Patent: Oct. 3, 2006

(54) MULTI-BEAM CELLULAR BASE STATION, MOBILE STATION AND METHOD FOR SENDING SPREAD SPECTRUM SIGNAL

(75) Inventors: Yoshio Takeuchi, Saitama (JP); Takashi Inoue, Saitama (JP); Akira Yamaguchi, Saitama (JP); Yoshiaki Amano, Saitama (JP)

(73) Assignee: KDDI Corporation, Tokyo (JP)

( * ) Notice: Subject to any disclaimer, the term of this patent is extended or adjusted under 35 U.S.C. 154(b) by 1027 days.

(21) Appl. No.: 10/115,016

(22) Filed: Apr. 4, 2002

(65) Prior Publication Data

US 2002/0177468 A1  Nov. 28, 2002

(30) Foreign Application Priority Data

Apr. 13, 2001 (JP) ............................ 2001/115422

(51) Int. Cl.
- *H04Q 7/00* (2006.01)
- *H04B 1/38* (2006.01)
- *H04B 7/216* (2006.01)

(52) U.S. Cl. ..................... 370/329; 370/342; 370/441; 455/561

(58) Field of Classification Search ..................... None
See application file for complete search history.

(56) References Cited

U.S. PATENT DOCUMENTS

| | | | | |
|---|---|---|---|---|
| 5,581,260 A | * | 12/1996 | Newman | .................... 342/374 |
| 5,953,325 A | * | 9/1999 | Willars | ........................ 370/335 |
| 6,141,335 A | * | 10/2000 | Kuwahara et al. | .......... 370/342 |
| 6,584,088 B1 | * | 6/2003 | Miya | ........................... 370/335 |
| 2002/0072393 A1 | * | 6/2002 | McGowan et al. | ......... 455/562 |
| 2002/0086708 A1 | * | 7/2002 | Teo et al. | .................... 455/561 |
| 2002/0128027 A1 | * | 9/2002 | Wong et al. | ................. 455/513 |

FOREIGN PATENT DOCUMENTS

JP          9-252266          9/1997

* cited by examiner

*Primary Examiner*—Huy D. Vu
*Assistant Examiner*—Clemence Han
(74) *Attorney, Agent, or Firm*—Armstrong, Kratz, Quintos, Hanson & Brooks, LLP

(57) ABSTRACT

A multi-beam cellular base station is for sending a spread spectrum signal to at least one mobile station, the base station comprising: first antenna for sending a common channel by a common beam that a directional pattern is formed previously; second antenna for sending a dedicated channel by a dedicated beam that a directional pattern is formed for each mobile station; and switching means for switching a sending time section of the common beam and a sending time section of the dedicated beam so that the sending time sections do not overlap within a time slot, the common beam and the dedicated beam are sent by same frequency.

5 Claims, 8 Drawing Sheets

MULTI-BEAM CELLULAR BASE STATION, MOBILE STATION AND METHOD FOR SENDING SPREAD SPECTRUM SIGNAL

FIELD OF THE INVENTION

The present invention relates to a multi-beam cellular base station, a mobile station and a method for sending a spread spectrum signal in a digital cellular mobile communication system.

DESCRIPTION OF THE RELATED ART

In the base station of the cellular mobile communication system, it is studied that a sending direction of an antenna is controlled for every dedicated channel sent to each the mobile station.

Figure 9:
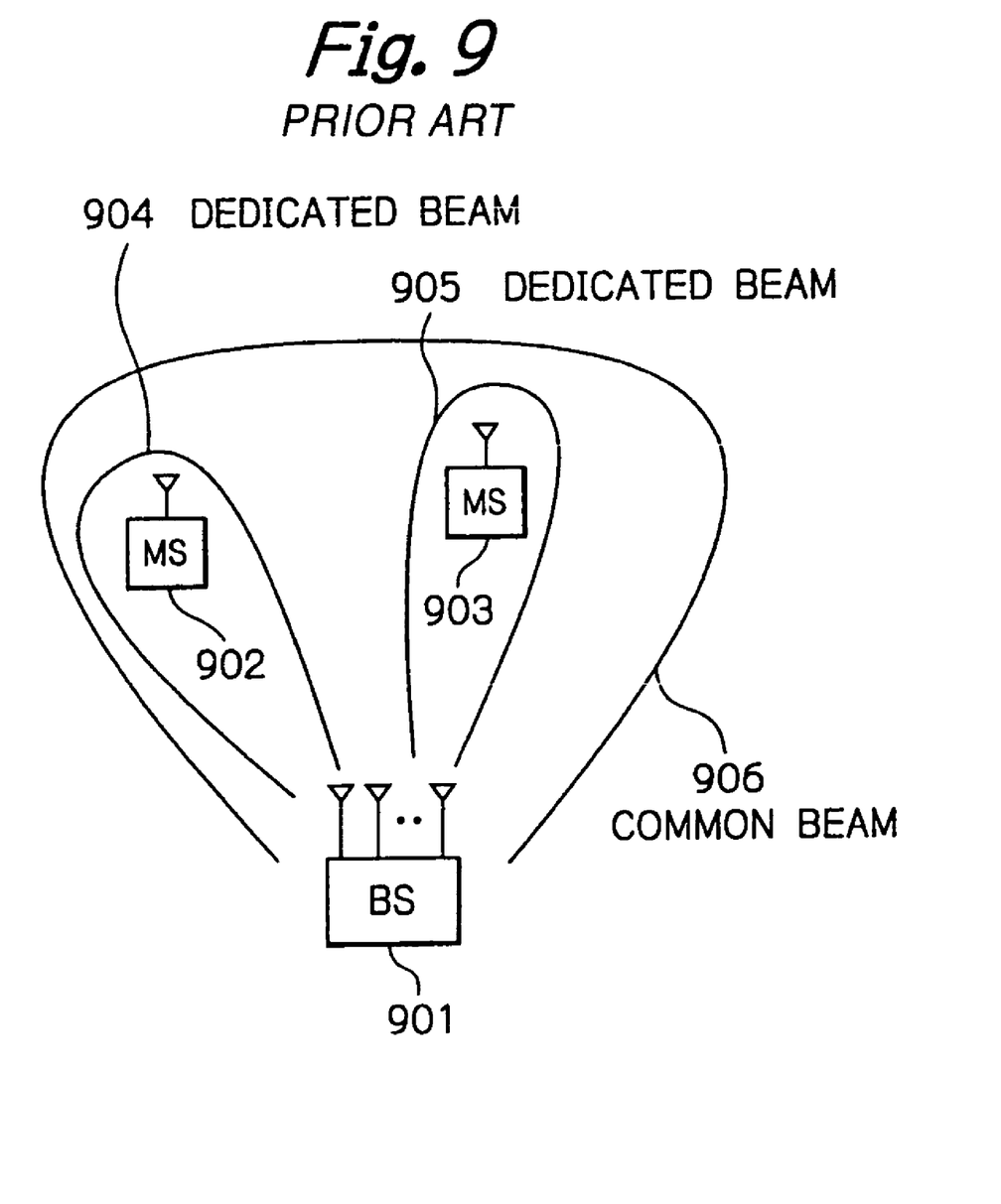
FIG. 9 shows a view of beams view for the common beam and the dedicated beam.

FIG. 9 shows a view of beams where the direction of the antennas are controlled. A base station 901 sends independently weighted dedicated channels using dedicated beams 904 and 905 with controlled directional pattern to mobile stations 902 and 903 respectively. Simultaneously, the base station 901 sends a common channel to all mobile stations in the service area by using a common beam 906 with fixed directional pattern.

The signal sent from the base station 901 is a direct sequence spread spectrum signal. The common channel and the dedicated channels are always sent by a same frequency. The dedicated channel consists of a dedicated traffic channel for sending information, and a dedicated pilot channel for sending a known pattern signal.

For example, in cdma2000 (3GPP2 C.S0002-A, Dec. 15, 1999) that is one of the schemes of IMT-2000, Pilot channel and Sync channel is corresponding to the common channel, and Traffic channel and Auxiliary Pilot channel is corresponding to the dedicated channel.

In the conventional cellular base station, the common channel and the dedicated channel are simultaneously sent on a same frequency. Thus, in an area where the common beam and the dedicated beam overlap, interference generates mutually between the beams. It is also possible to reduce the mutual interference by spreading the common channel and the dedicated channel by an orthogonal spreading code. However, the interference by multi-pass is not avoided. Furthermore, if it assumes that the base station controls a sending direction of the antenna for the dedicated channel, the common channel and the dedicated channel generates a difference between propagation delays since the propagation paths of the channels differ. Thereby, a multi-pass interference between the common channel and the dedicated channels becomes larger.

SUMMARY OF THE INVENTION

It is therefore an object of the present invention to provide a multi-beam cellular base station and a mobile station that can reduce the mutual interference of the common channel and the dedicated channel when the cellular base station controls a sending direction of the dedicated channel.

According to the present invention, a multi-beam cellular base station for sending a spread spectrum signal to at least one mobile station, the base station comprising: first antenna for sending a common channel by a common beam that a directional pattern is formed previously; second antenna for sending a dedicated channel by a dedicated beam that a directional pattern is formed for each mobile station; and switching unit for switching a sending time section of the common beam and a sending time section of the dedicated beam so that the sending time sections do not overlap within a time slot, the common beam and the dedicated beam are sent by same frequency.

It is preferred that the base station further comprising a dedicated beam forming unit for adaptively forming the directional pattern of the dedicated beam sent from the second antenna for every time slot, corresponding to change of mobile station to be sent.

It is preferred that the common channel including a common pilot channel, the dedicated channel including a dedicated traffic channel and a dedicated pilot channel, and the switching unit sending to synchronize the dedicated traffic channel and the dedicated pilot channel for every mobile station.

It is preferred that the base station further comprising unit for spreading the dedicated pilot channel and the dedicated traffic channel for every mobile station by an mutually orthogonal code.

It is preferred that the common channel including a common pilot channel, the dedicated channel including a dedicated traffic channel and a dedicated pilot channel, and the switching unit sending the dedicated traffic channel and the dedicated pilot channel for every mobile station by time division multiplexing without overlapping in time.

It is preferred that the multi-beam cellular base station further comprising unit for spreading a plurality of dedicated channels by a same spreading code.

Furthermore, according to the present invention, a mobile station for communicating with a multi-beam cellular base station for sending a spread spectrum signal, the multi-beam cellular base station comprising first antenna for sending a common channel by a common beam that a directional pattern is formed previously, second antenna for sending a dedicated channel by a dedicated beam that a directional pattern is formed for each mobile station, and switching unit for switching a sending time section of the common beam and a sending time section of the dedicated beam so that the sending time sections do not overlap within a time slot, the common beam and the dedicated beam are sent by same frequency, the mobile station comprising: switching unit for switching a received beam to the common channel or the dedicated channel based on a slot synchronization signal.

It is preferred that the common channel including a common pilot channel, the dedicated channel including a dedicated traffic channel and a dedicated pilot channel, and wherein the mobile station further comprising: estimation unit for estimating a channel characteristic from the dedicated pilot channel received; and demodulation unit for demodulating the dedicated channel by using the estimated channel characteristic.

Furthermore, according to the present invention, a cellular system comprising multi-beam cellular base stations and single beam cellular base stations, the multi-beam cellular base station having first antenna for sending a common channel by a common beam that a directional pattern is formed previously, second antenna for sending a dedicated channel by a dedicated beam that a directional pattern is formed for each mobile station, and switching unit for switching a sending time section of the common beam and a sending time section of the dedicated beam so that the sending time sections do not overlap within a time slot, the common beam and the dedicated beam are sent by same frequency, and the single beam cellular base station sending the common channel and the dedicated channel by same directional pattern beam, wherein the multi-beam cellular base station including a common pilot channel in the common channel, and including a dedicated traffic channel and a dedicated pilot channel in the dedicated channel, and wherein the single beam cellular base station sending the dedicated traffic channel in a section of a data format, where the dedicated pilot channel is sent in the case of the multi-beam cellular base station, and sending a dedicated traffic channel data in a same section of a data format, where the dedicated traffic channel is sent in the case of multi-beam cellular base station.

It is preferred that first transmission information bit rate and second transmission information bit rate are controlled to become equal, the first transmission information is included in signal of a dedicated traffic channel received from the multi-beam cellular base station, and the second transmission information is included in signal of a dedicated traffic channel received from the single beam cellular base station.

Furthermore, according to the present invention, a mobile station for communicating with a cellular system comprising a multi-beam cellular base station and a single beam cellular base station, the multi-beam cellular base station having first antenna for sending a common channel by a common beam that a directional pattern is formed previously, second antenna for sending a dedicated channel by a dedicated beam that a directional pattern is formed for each mobile station, and switching unit for switching a sending time section of the common beam and a sending time section of the dedicated beam so that the sending time sections do not overlap within a time slot, the common beam and the dedicated beam are sent by same frequency, and the single beam cellular base station sending the common channel and the dedicated channel by same directional pattern beam, the mobile station comprising unit for distinguishing whether the cellular base station for sending a signal is the multi-beam base station or the single beam base station, the signal is processed according to the identification.

Furthermore, according to the present invention, a method for sending spread spectrum signal from cellular base station to a plurality of mobile stations, the method comprising the steps of: sending a common channel for a predetermined time in every time slot, by a common beam that a directional pattern is formed previously; and sending a dedicated channel for a time other than the predetermined time in every time slot, by a dedicated beam that a directional pattern is formed adaptively for each mobile station; the common channel and the dedicated channel sent by same frequency are not overlap within a time slot.

Further objects and advantages of the present invention will be apparent from the following description of the preferred embodiments of the invention as illustrated in the accompanying drawings.

DESCRIPTION OF THE PREFERRED EMBODIMENTS

Figure 1:
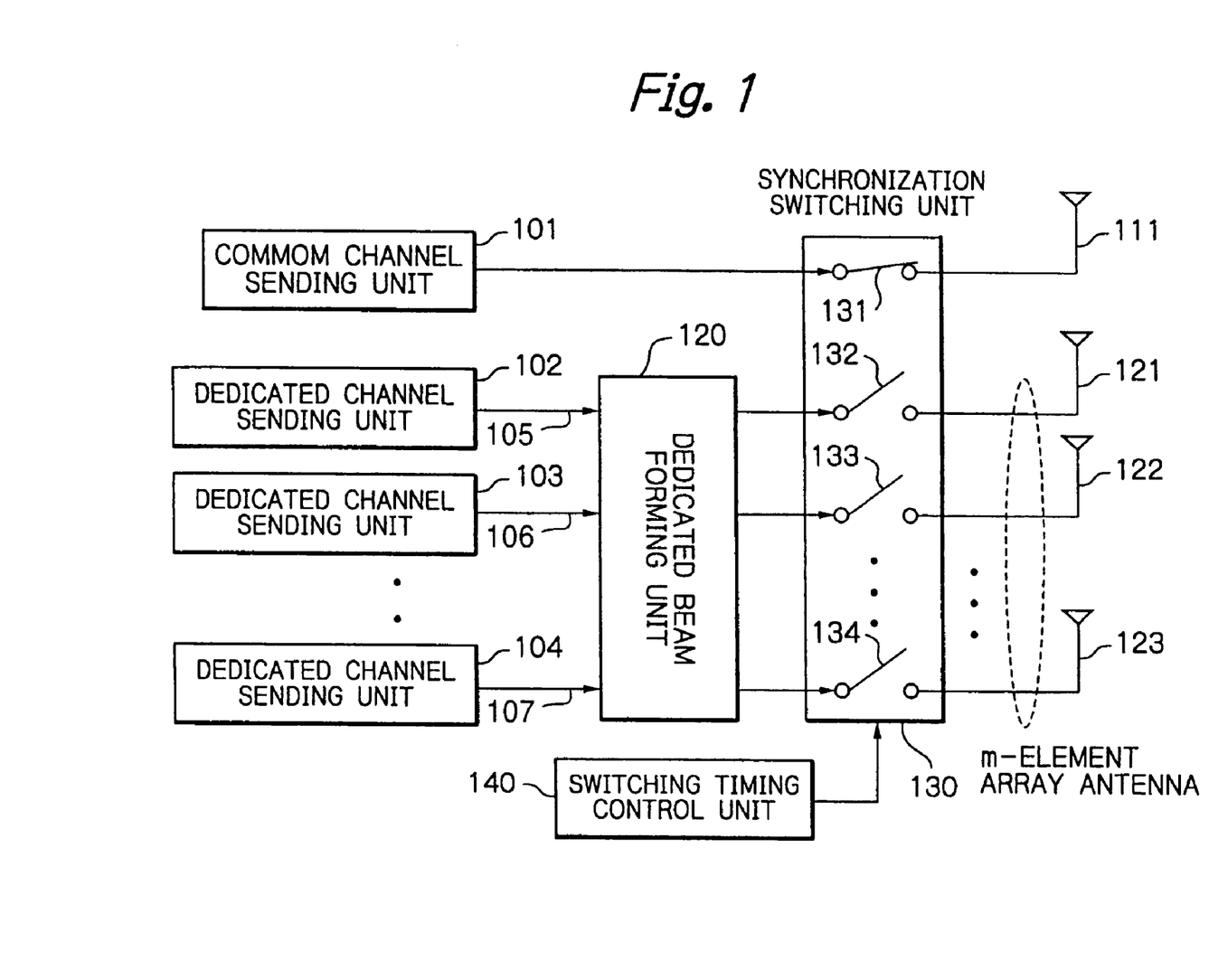
FIG. 1 shows a block diagram illustrating a multi-beam cellular base station as a first embodiment according to the present invention.

FIG. 1 shows a block diagram illustrating a multi-beam cellular base station as a first embodiment according to the present invention. As shown in FIG. 1, the base station includes a common channel sending unit 101, a plurality of dedicated channel sending units 102–104, a fixed beam antenna 111, a dedicated beam forming unit 120, antenna arrays 121–123, a synchronous switch unit 130 including switches 131–134, and a switching timing control unit 140.

The operation of the multi-beam cellular base station in FIG. 1 is described as follows. The common channel-sending unit 101 sends a common channel of spread spectrum. The common channel is sent from the fixed beam antenna 111 when the switch 131 closes. The fixed beam antenna 111 has a beam pattern for covering a service area of the base station. All mobile stations in the service area can receive the signal from the fixed beam antenna 111. Thus, the beam sent from the fixed beam antenna 111 is called "common beam" in the following.

As shown in FIG. 1, n (n≧1) dedicated channels (105, 106 and 107) are sent simultaneously. The dedicated channel sending units respectively sends the dedicated channel (105, 106 and 107) of spread spectrum for specific mobile station. The dedicated beam-forming unit 120 assigns weight to the dedicated channel (105, 106 and 107) respectively in order to form the dedicated beam for every mobile station. The dedicated beams respectively are outputted form the antenna arrays 121–123 of m elements when the switches 132–134 close. The switching timing control unit 140 controls a switching timing of the switches 131–134. Then, the switching timing control unit 140 controls switching synchronous so that a closing period of switch 131 and a closing period of switch 132–134 do not overlap.

According to other preferred embodiments, in order to send the common beam, array antennas 121–123 of m elements are used without using the fixed beam antenna 111 specifically. Also, the antenna that can control the direction of an antenna beam is substituted for the array antenna.

Figure 2:
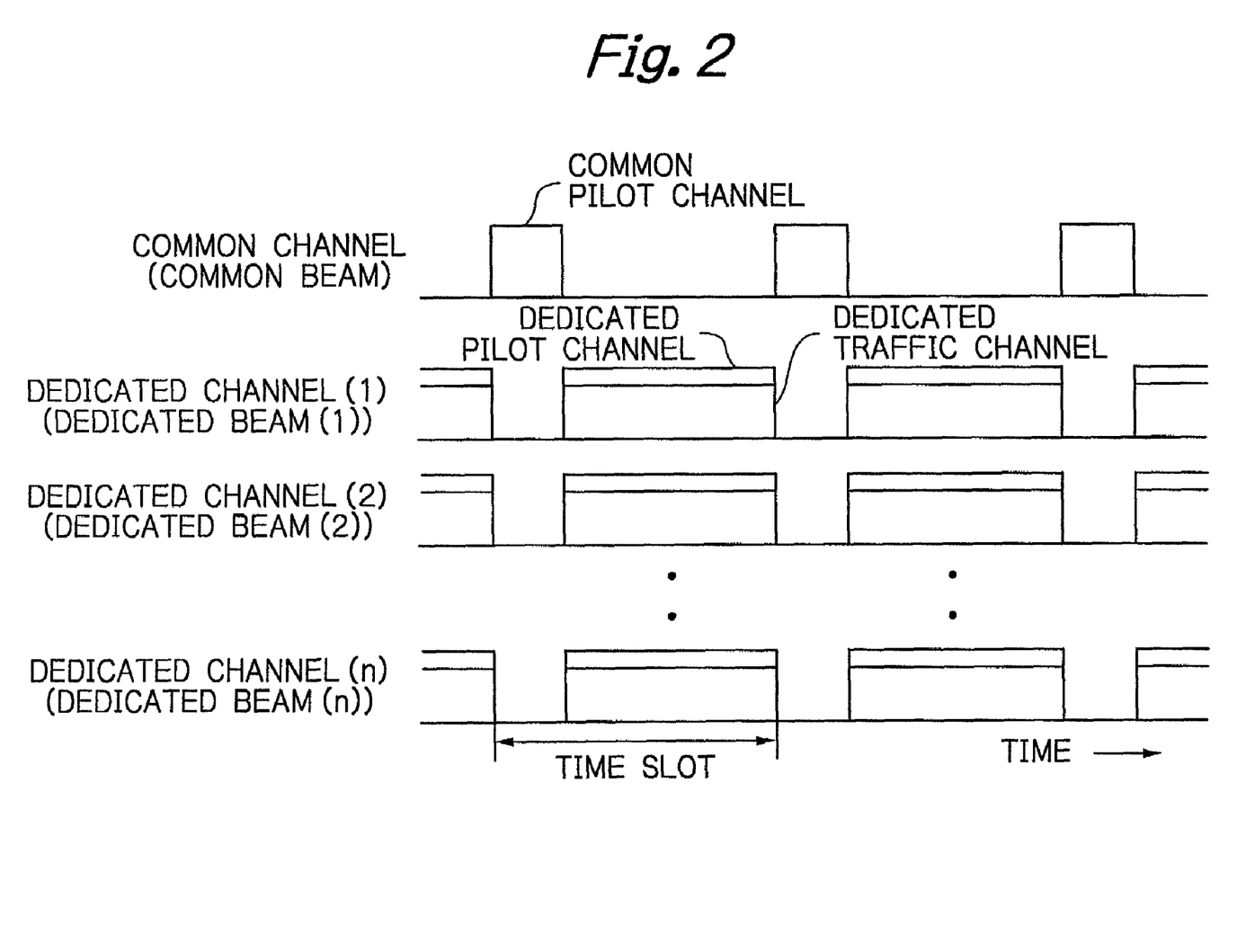
FIG. 2 shows a signal format of each channel sent by the multi-beam cellular base station in FIG. 1.

FIG. 2 shows a signal format of each channel sent by the multi-beam cellular base station in FIG. 1. As shown in FIG. 2, the common channel is sent in the front section on every time slot of fixed period. And, the dedicated channel is sent in the remaining section on the time slot.

The common channel is a common pilot channel, for example. The common pilot channel is received by all mobile stations in a cell, and may be used to timing synchronization of chip or time slot or cell identification.

The dedicated channel has a dedicated traffic channel for sending information and a dedicated pilot channel for sending known pattern signal. The known pattern signal is used as a reference signal for demodulating the traffic channel.

As shown in FIG. 2, the dedicated traffic channel and the dedicated pilot channel are sent simultaneously. Then, the dedicated traffic channel and the dedicated pilot channel can be spread with different spreading codes so that the channels can be distinguished. Furthermore, the channels may be spread with mutually orthogonal code in order to reduce mutual interference.

Figure 3:
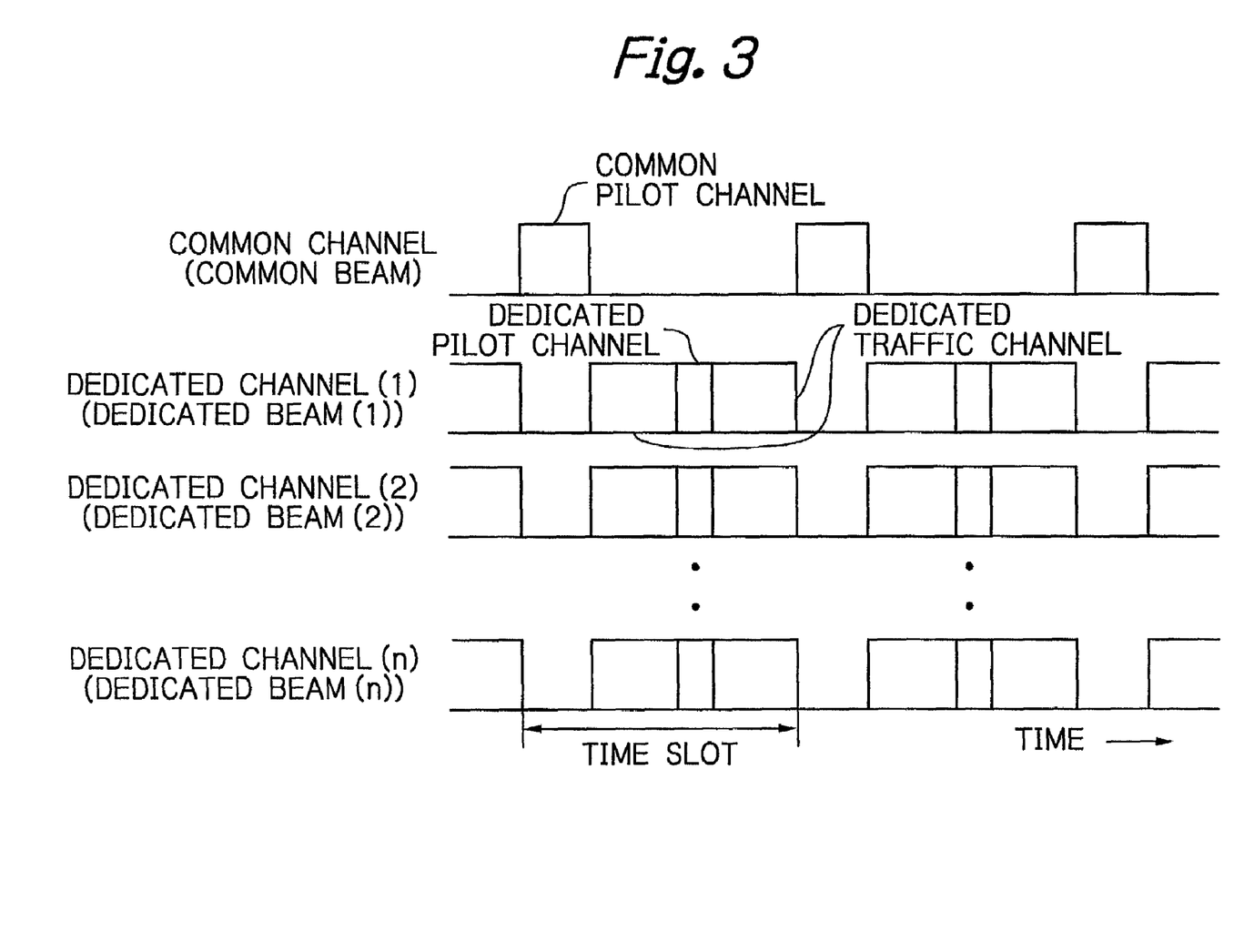
FIG. 3 shows another embodiment of signal format in FIG. 2.

FIG. 3 shows another embodiment of signal format in FIG. 2. In the signal format in FIG. 3, the dedicated pilot channel and the dedicated traffic channel are sent in time division. The time division timing of each channel is not limited to the timing shown in FIG. 3.

In addition, the timing for sending the common channel is not limited to a front section of time slots in FIG. 2 and FIG. 3. As long as the timing does not overlap with the sending timing of the dedicated channel, the timing for sending the common channel may be sent with arbitrary timing or a plurality of sections. Similarly, as long as the timing for sending the dedicated channel does not overlap with the sending timing of the common channel, the timing for sending the dedicated channel may be sent with arbitrary timing.

Furthermore, each transmit power of the common channel and the dedicated channel can be set up arbitrary. As shown in FIG. 2 and FIG. 3, when the dedicated channel consists of the dedicated traffic channel and the dedicated pilot channel, the transmit power of each channel can also be set up arbitrarily.

Furthermore, it is also possible to change a destination mobile station to which the dedicated channel is sent for every time slot. In this case, when the destination mobile station is changed, the dedicated beam corresponding to the mobile station is formed again. Furthermore, the number of dedicated channels used for every time slot may be modified.

If a plurality of dedicated beams respectively have different directional pattern, the same code can also be used as a code for spectrum spreading a plurality of dedicated channel for sending with the plurality of dedicated beams.

According to first embodiment as mentioned above, an interference between the common beam and the dedicated beam can disappear because the common channel sent by the common beam do not overlap in time with the dedicated channel sent by the dedicated beam.

Furthermore, for example, there is a case that the common pilot channel is sent by the common beam and is used also for the identification of a cell, in particular, a case that a sending timing is made in synchronous between the neighboring base stations for using a same frequency in cellular systems (CDMA cellular system etc.). In such a case, since the dedicated beam of neighboring base stations does not make interference to the common pilot channel, a quality of the common pilot channel received by the mobile station improves considerably, and the search around the base station becomes easy.

Furthermore, similarly, since interference from the common channel to the dedicated channel reduces considerably, the transmit power of the dedicated channel is reduced, and it is possible to extend the area covered by the dedicated beam.

Figure 4:
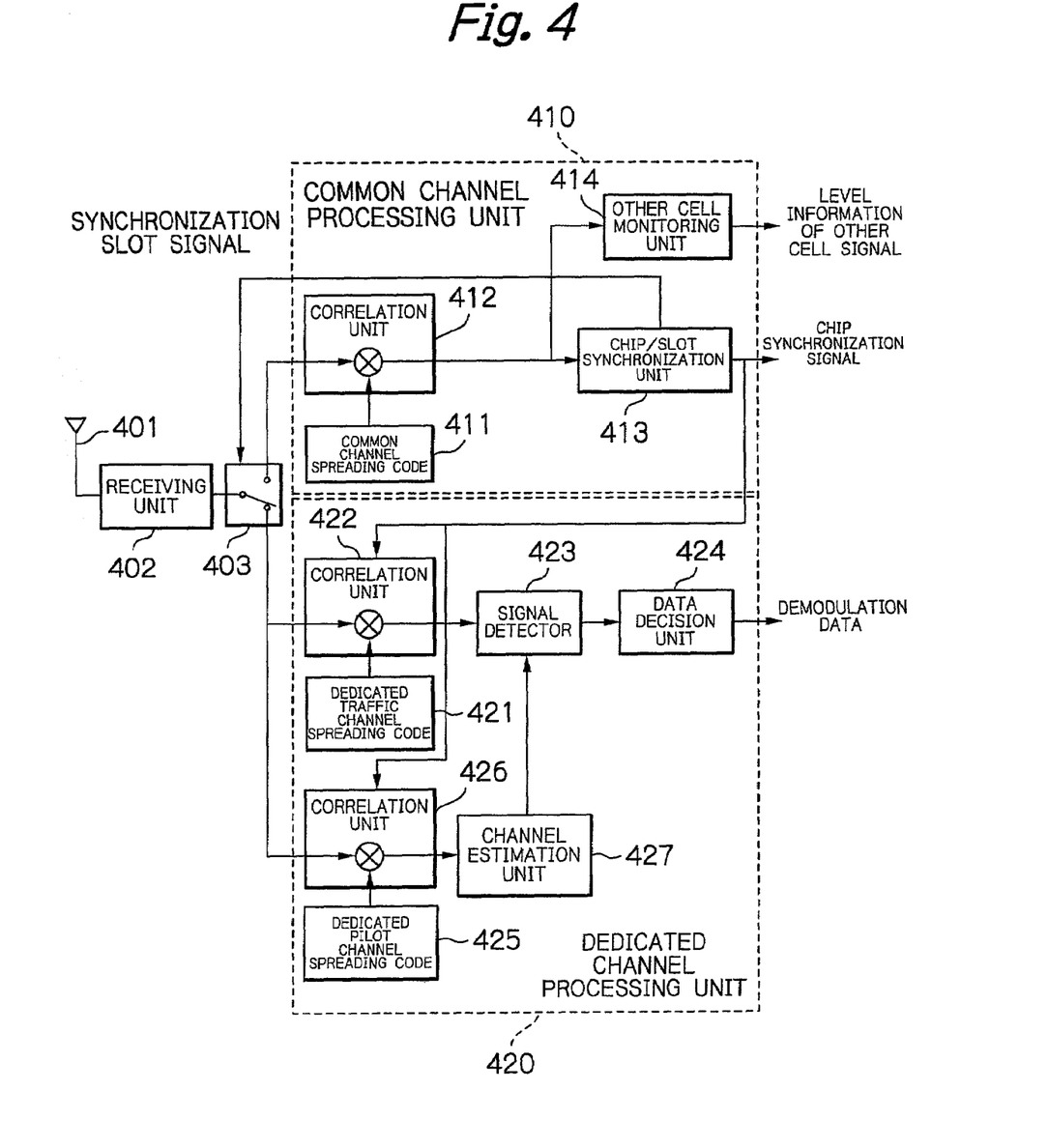
FIG. 4 shows a block diagram illustrating a mobile station as a second embodiment according to the present invention.

FIG. 4 shows a block diagram illustrating a mobile station as a second embodiment according to the present invention. In FIG. 4, the mobile station has an antenna 401, a radio receive unit 402, a switch 403, a common channel processing unit 410, a common channel spreading code 411, a correlation unit 412, a chip/time slot synchronization unit 413, an other cells monitoring unit 414, a dedicated channel processing unit 420, a dedicated traffic channel spreading code 421, a correlation unit 422, a signal detector 423, a data decision unit 424, a dedicated pilot channel spreading code 425, a correlation unit 426, a channel estimation unit 427.

The operation of the cellular mobile station in FIG. 4 is described as follows. It is assumed that a format of received signal is of FIG. 2. The signal received by the antenna 401 down-converts by the radio receive unit 402, and is inputted through the switch 403 into the common channel processing unit 410 or the dedicated channel processing unit 420. The switch 403 operations to synchronize with time slot based on time slot synchronization signal. Also, the switch 403 switches to the common channel processing unit when the common channel is received, or to the dedicated channel processing unit when the dedicated channel is received.

The common channel is despread by the correlation unit 412 based on the common channel spreading code 411. Then, the common channel is input to the chip/slot synchronization unit 413, and the chip/slot synchronization unit 413 extracts a chip synchronization signal and a time slot synchronization signal. The chip synchronization signal is inputted to the correlation unit 422 of the dedicated traffic channel and to the correlation unit 426 of the dedicated pilot channel. The correlation unit 422 determines a code phase of despreading for the dedicated traffic channel spreading code 421. Also, the correlation unit 426 determines a code phase of despreading for the dedicated pilot channel spreading code 425. Furthermore, in the case that other cells use the same common channel spreading code 411 and the common channel is sent by shifting a code phase, the other cells signal level information can be obtained to measure the receive level of the common channel of a different code phase by the other cells monitor unit 414 for inputting the signal from the correlation unit 412.

The dedicated pilot channel is despreaded by the correlation unit 426 based on the dedicated pilot channel spreading code 425. Then, channel characteristic information is detected from the spread signal by the channel estimation unit 427. The channel characteristic information is sent to the signal detector 423 of the dedicated traffic channel.

The dedicated traffic channel is despreaded by the correlation unit 422 based on the dedicated traffic channel spreading code 421. The signal outputted from the correlation unit 422 is coherently detected by the detector 423 based on the channel characteristic information outputted from the channel estimation unit 427. The signal outputted from the detector 423 is decided and demodulated by the data decision unit 424. As a consequence, the demodulated data is outputted.

In addition, in order to obtain the chip synchronization signal/the time slot synchronization signal, the common channel does not need to be used. Also, it may obtain the chip synchronization signal/the time slot synchronization signal from the correlation unit of the dedicated channel. Furthermore, if it is not a system that the other cells use the same spreading code 411 and a code phase is shifted, the structure for obtaining the signal level information is unnecessary.

The above-mentioned description corresponds in a case that the dedicated traffic channel is spread by the single spreading code. However, in the case that the dedicated traffic channel is a multiplex of signals spread by a plurality of spreading codes, the structure may be formed with a plurality of the dedicated traffic channel spreading codes 421, the correlation units 422, the signal detectors 423 and the data judging units 424. In this case, processing is done for every spreading code by corresponding units.

In the case that a format of received signal differs from FIG. 2, if the base station sends the common channel by the common beam for the predetermined time for every time slot, and at least one dedicated channel is sent by the dedicated beam and by the same frequency with the common beam with the timing that does not overlap with the common beam, the operation up to demodulation can be accomplished by operating units corresponding to the received signal.

As mentioned above, according to second embodiment, the dedicated traffic channel to the mobile station can be coherently detected and demodulated correctly, if the base station sends the common channel by the common beam for the predetermined time for every time slot, and at least one dedicated channel by the dedicated beam is send with same frequency as the common beam and with the timing that does not overlap with the common beam.

Figure 5:
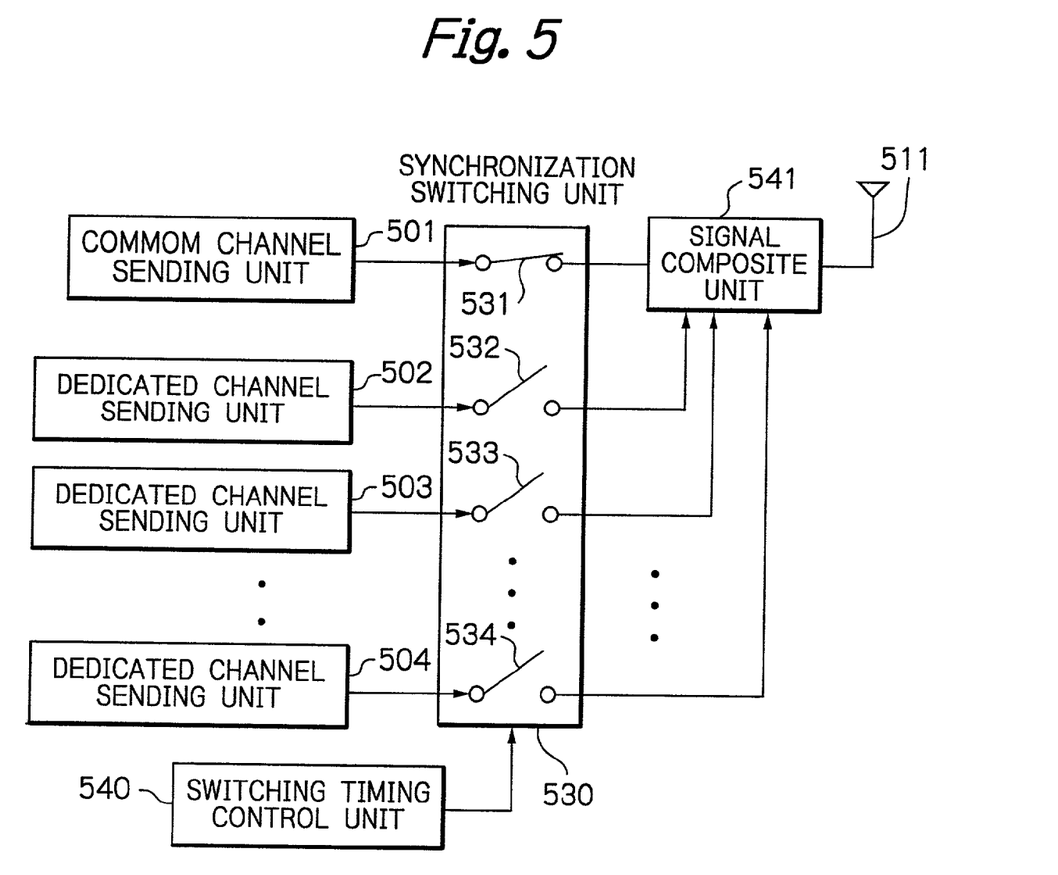
FIG. 5 shows a block diagram illustrating a single beam cellular base station in a third embodiment according to the present invention.
Figure 6:
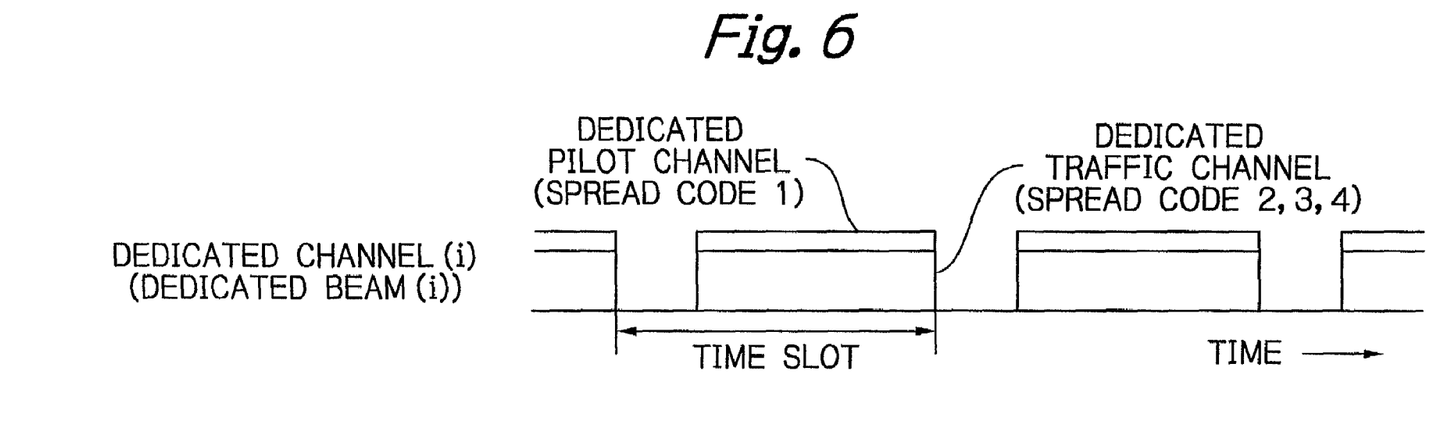
FIG. 6 shows a dedicated channel format sent from the multi-beam cellular base station in FIG. 1.

It is considered to the combination of the multi-beam cellular base station by first embodiment of the present invention and the single beam cellular base station that a direction of the dedicated channel is fixed. The combination of the multi-beam cellular base station in FIG. 1 and the single beam cellular base station in FIG. 5 are assumed. In FIG. 5, the common channel and the dedicated channel are sent so that there are not overlaps in time, and a fixed beam antenna 511 sends any channel with the same beam. Then, the cellular base station in FIG. 1 sends the dedicated channel containing the dedicated pilot channel, for example, that is shown in FIG. 6. Also, the single beam cellular base station in FIG. 5 sends the dedicated channel that does not contain the dedicated pilot channel in FIG. 7. As for the signal formats in FIG. 6 and FIG. 7, whether the dedicated pilot channel exists or not differs, and other signal format is equivalent.

Figure 8:
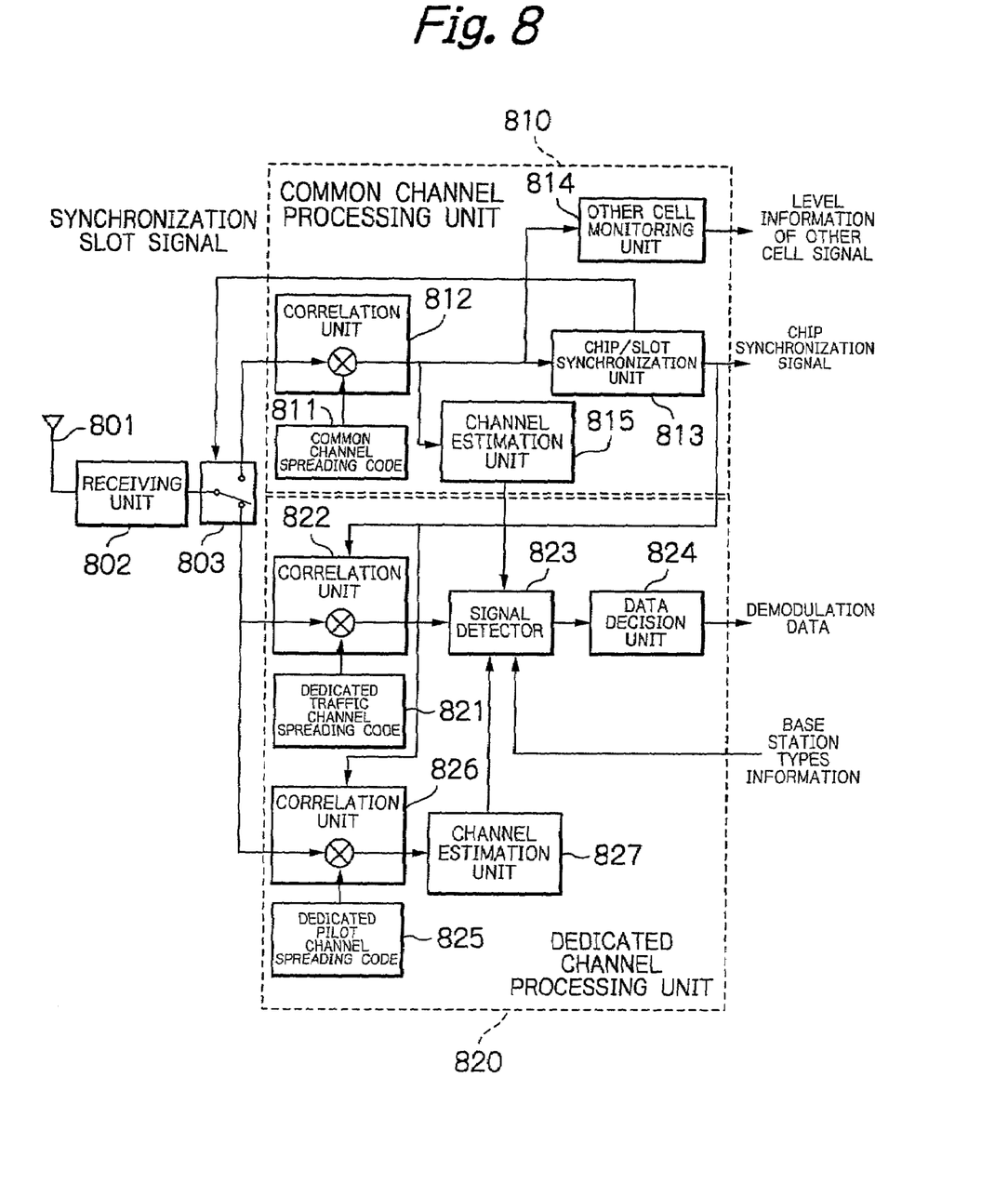
FIG. 8 shows a block diagram illustrating a mobile station in the system of third embodiment according to the present invention.

FIG. 8 shows a block diagram illustrating a mobile station in the system of third embodiment according to the present invention. In FIG. 8, the mobile station has an antenna 801, a radio receive unit 802, a switch 803, a common channel processing unit 810, a common channel spreading code 811, a correlation unit 812, a chip/time slot synchronization unit 813, an other cells monitoring unit 814, a channel estimation unit 815, a dedicated channel processing unit 820, a dedicated traffic channel spreading code 821, a correlation unit 822, a signal detector 823, a data decision unit 824, a dedicated pilot channel spreading code 825, a correlation unit 826, a channel estimation unit 827.

The operation of the cellular mobile station in FIG. 8 is described as follows. It assumes that the mobile station recognizes whether the structure of the base station is of FIG. 1 or of FIG. 5. The cellular base station in FIG. 1 sends the common channel and the dedicated channel of format in FIG. 6. The single beam cellular base station in FIG. 5 sends the common channel and the dedicated channel of format in FIG. 7.

The channel received by the antenna 801 is down-converted by the radio receive unit 802, and is inputted into the common channel processing unit 810 or the dedicated channel processing unit 820 through the switch 803. The switch 803 operations to synchronize with time slot based on synchronization signal. Also, the switch 803 switches to the common channel processing unit when the common channel is received, or to the dedicated channel processing unit when the dedicated channel is received.

The common channel is despread by the correlation unit 812 based on the common channel spreading code 811. Then, the common channel is input to the chip/slot synchronization unit 813, and the chip/slot synchronization unit 813 extracts a chip synchronization signal and a time slot synchronization signal. The chip synchronization signal is inputted to the correlation unit 822 of the dedicated traffic channel and to the correlation unit 826 of the dedicated pilot channel. The correlation unit 822 determines a code phase of despreading for the dedicated traffic channel spreading code 821. The correlation unit 826 determines a code phase of despreading for the dedicated pilot channel spreading code 825. Also, in a case that the cellular radio base station for sending a signal to the mobile station is the structure in FIG. 5, since the common channel and the dedicated channel are sent with the same common beam, the channel estimation unit 815 detects a channel characteristic information from the output signal of the correlation circuit 812. And, the channel characteristic information is sent to the signal detector 823 of an dedicated traffic channel. Furthermore, in the case that other cells use the same common channel spreading code 811 and the common channel is sent by shifting a code phase, the other cells signal level information can be obtained to measure the receive level of the common channel of a different code phase by the other cells monitor unit 814 for inputting the signal from the correlation unit 812.

If the cellular base station for sending a signal to mobile station is the structure of FIG. 1, the dedicated pilot channel is despread by the correlation unit 826 based on the dedicated pilot channel spreading code 825. Then, channel characteristic information is detected from the spread signal by the channel estimation unit 827. The channel characteristic information is sent to the signal detector 823 of the dedicated traffic channel.

The dedicated traffic channel is despread by correlation unit 822 based on the dedicated traffic channel spreading code 821. The signal outputted from the correlation unit 822 is coherently detected by detector 823 based on the channel characteristic information outputted by the channel estimation unit 815 or the channel estimation unit 827. The signal outputted from the detector 823 is decided and demodulated by the data decision unit 824. As a consequence, the demodulated data is outputted.

In addition, in order to obtain the chip synchronization signal/the time slot synchronization signal, the common channel does not need to be used. Also, it may obtain the chip synchronization signal/the time slot synchronization signal from the correlation unit of the dedicated channel. Furthermore, if it is not a system that the other cells use the same spreading code 811 and a code phase is shifted, the structure for obtaining the signal level information is unnecessary.

The above-mentioned description corresponds in a case that the dedicated traffic channel is spread by the single spreading code. However, in the case that the dedicated traffic channel is a multiplex of signals spread by a plurality of spreading codes, the structure may be formed with a plurality of the dedicated traffic channel spreading codes 821, the correlation units 822, the signal detectors 823 and the data decision units 824. In this case, processing is done for every spreading code by corresponding units.

Figure 7:
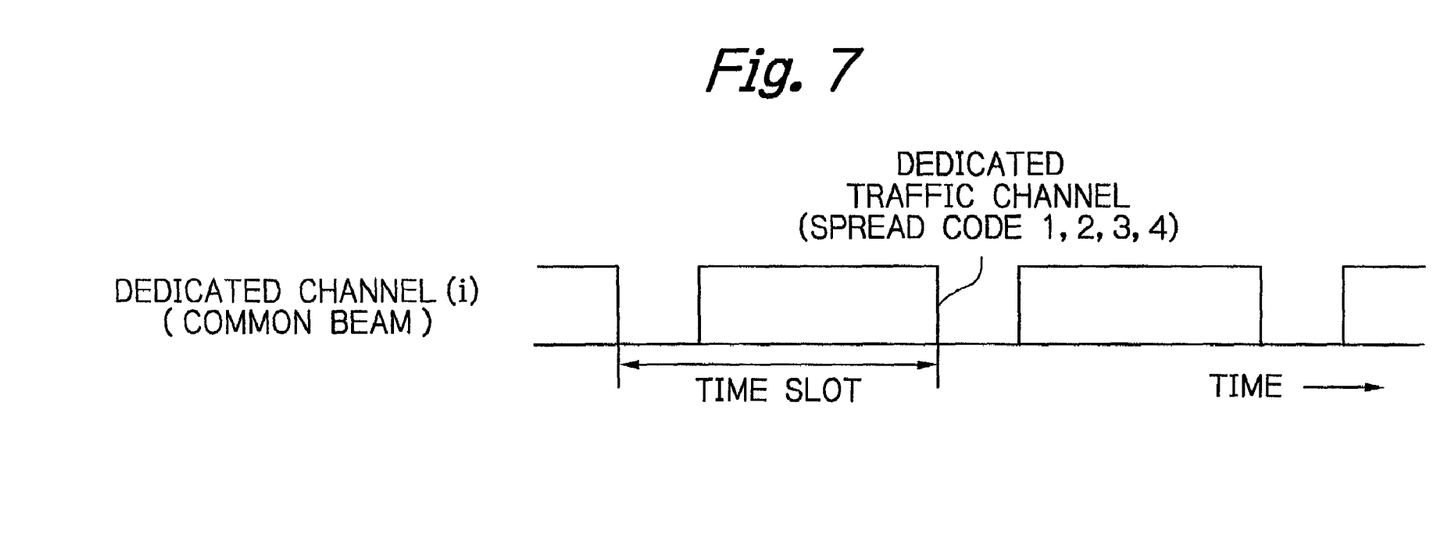
FIG. 7 shows a dedicated channel format sent from the single beam cellular base station.

In the case that a format of received signal differs from FIG. 6 and FIG. 7, if the base station sends the common channel by the common beam for the predetermined time for every time slot, and at least one dedicated channel is sent by the dedicated beam and by the same frequency with the common beam with the timing that does not overlap with the common beam, the operation up to demodulation can be accomplished by operating units corresponding to the received signal.

The transmission bit rate of the dedicated traffic channel differs by the format of FIG. 6 and the format of FIG. 7. However, if an error correcting coding is performed, the information rate before coding or after decoding can also be made equal by regulating the coding rate.

According to the third embodiment, if the base station for controlling a direction of the dedicated channel and the base station for fixing the direction of the dedicated channel are mixed in the system, it is enabled to coherently detect the dedicated traffic channel of the destination mobile station correctly. Also, between the case of including the dedicated pilot channel and the case of not including the dedicated pilot channel, a same physical layer can be provided for higher layers irrespective of the existence of direction control of the dedicated channel. In the case, the coding rate of error correcting code rate may be regulated, and the information rate of the dedicated traffic channel before coding and after decoding are made equal.

As mentioned above in detail, according to the first embodiment in the present invention, an interference between the common beam and the dedicated beam can disappear because the common channel sent by the common beam do not overlap in time with the dedicated channel sent by the dedicated beam. Furthermore, for example, there is a case that the common pilot channel is sent by the common beam and is used also for the identification of a cell, in particular, a case that a sending timing is made in synchronous between the neighboring base stations for using a same frequency in cellular systems (CDMA cellular system etc.). In such a case, since the dedicated beam of neighboring base stations does not make interference to the common pilot channel, a quality of the common pilot channel received by the mobile station improves considerably, and the search around the base station becomes easy. Furthermore, similarly, since interference form the common channel to the dedicated channel reduces considerably, the transmit power of the dedicated channel is reduced, and it is possible to extend the area covered by the dedicated beam.

According to second embodiment, the dedicated traffic channel to the mobile station can be coherently detected and demodulated correctly, if the base station sends the common channel by the common beam for the predetermined time for every time slot, and at least one dedicated channel by the dedicated beam is send with same frequency as the common beam and with the timing that does not overlap with the common beam.

According to the third embodiment, if the base station for controlling a direction of the dedicated channel and the base station for fixing the direction of the dedicated channel are mixed in the system, it is enabled to coherently detect the dedicated traffic channel of the destination mobile station correctly. Also, between the case of including the dedicated pilot channel and the case of not including the dedicated pilot channel, a same physical layer can be provided for higher layers irrespective of the existence of direction control of the dedicated channel. In the case, the coding rate of error correcting code may be regulated, and the information rate of the dedicated traffic channel before coding and after decoding are made equal.

Many widely different embodiments of the present invention may be constructed without departing from the spirit and scope of the present invention. It should be understood that the present invention is not limited to the specific embodiments described in the specification, except as defined in the appended claims.

What is claimed is:

1. A system comprising a mobile station and a multi-beam cellular base station, the mobile station for communicating with the multi-beam cellular base station, said multi-beam cellular base station comprising first antenna for sending a common channel by a common beam that has a beam pattern for covering a service area of said multi-beam cellular base station, second antenna for sending a dedicated channel by a dedicated beam that a directional pattern is formed for each mobile station, and switching means for switching a sending time section of said common beam and a sending time section of said dedicated beam so that said sending time sections do not overlap within a time slot that is associated with those sending time sections, said common beam and said dedicated beam are sent by same frequency, said mobile station comprising switching means for switching a received beam to said common channel or said dedicated channel based on a slot synchronization signal.

2. A mobile station as claimed in claim 1,
wherein said common channel including a common pilot channel, and said dedicated channel including a dedicated traffic channel and a dedicated pilot channel, and
wherein said mobile station further comprising:
estimation means for estimating a channel characteristic from said dedicated pilot channel received; and
demodulation means for demodulating said dedicated channel by using said estimated channel characteristic.

3. A cellular system comprising multi-beam cellular base stations and single beam cellular base stations, said multi-beam cellular base station having first antenna for sending a common channel by a common beam that a directional pattern is formed previously, second antenna for sending a dedicated channel by a dedicated beam that a directional pattern is formed for each mobile station, and switching means for switching a sending time section of said common beam and a sending time section of said dedicated beam so that said sending time sections do not overlap within a time slot, said common beam and said dedicated beam are sent by same frequency, and said single beam cellular base station sending said common channel and said dedicated channel by same directional pattern beam,
wherein said multi-beam cellular base station including a common pilot channel in said common channel, and including a dedicated traffic channel and a dedicated pilot channel in said dedicated channel, and
wherein said single beam cellular base station sending said dedicated traffic channel in a section of a data format, where said dedicated pilot channel is sent in the case of said multi-beam cellular base station, and sending a dedicated traffic channel data in a same section of a data format, where said dedicated traffic channel is sent in the case of multi-beam cellular base station.

4. A cellular system as claimed in claim 3,
wherein first transmission information bit rate and second transmission information bit rate are controlled to become equal, said first transmission information is included in signal of a dedicated traffic channel received from said multi-beam cellular base station, and said second transmission information is included in signal of a dedicated traffic channel received from said single beam cellular base station.

5. A cellular system comprising a mobile station, a multi-beam cellular base station and a single beam cellular base station, the mobile station for communicating with the multi-beam cellular base station and the single beam cellular base station, said multi-beam cellular base station having first antenna for sending a common channel by a common beam that a directional pattern is formed previously, second antenna for sending a dedicated channel by a dedicated beam that a directional pattern is formed for each mobile station, and switching means for switching a sending time section of said common beam and a sending time section of said dedicated beam so that said sending time sections do not overlap within a time slot, said common beam and said dedicated beam are sent by same frequency, and said single beam cellular base station sending said common channel and said dedicated channel by same directional pattern beam, said mobile station comprising means for distinguishing whether said cellular base station for sending a signal is said multi-beam base station or said single beam base station, said signal is processed according to the identification.

* * * * *